No. 869,061. PATENTED OCT. 22, 1907.
R. A. COX.
SUPPORTING FRAME FOR CANOPIES, AWNINGS, &c.
APPLICATION FILED MAY 13, 1907.
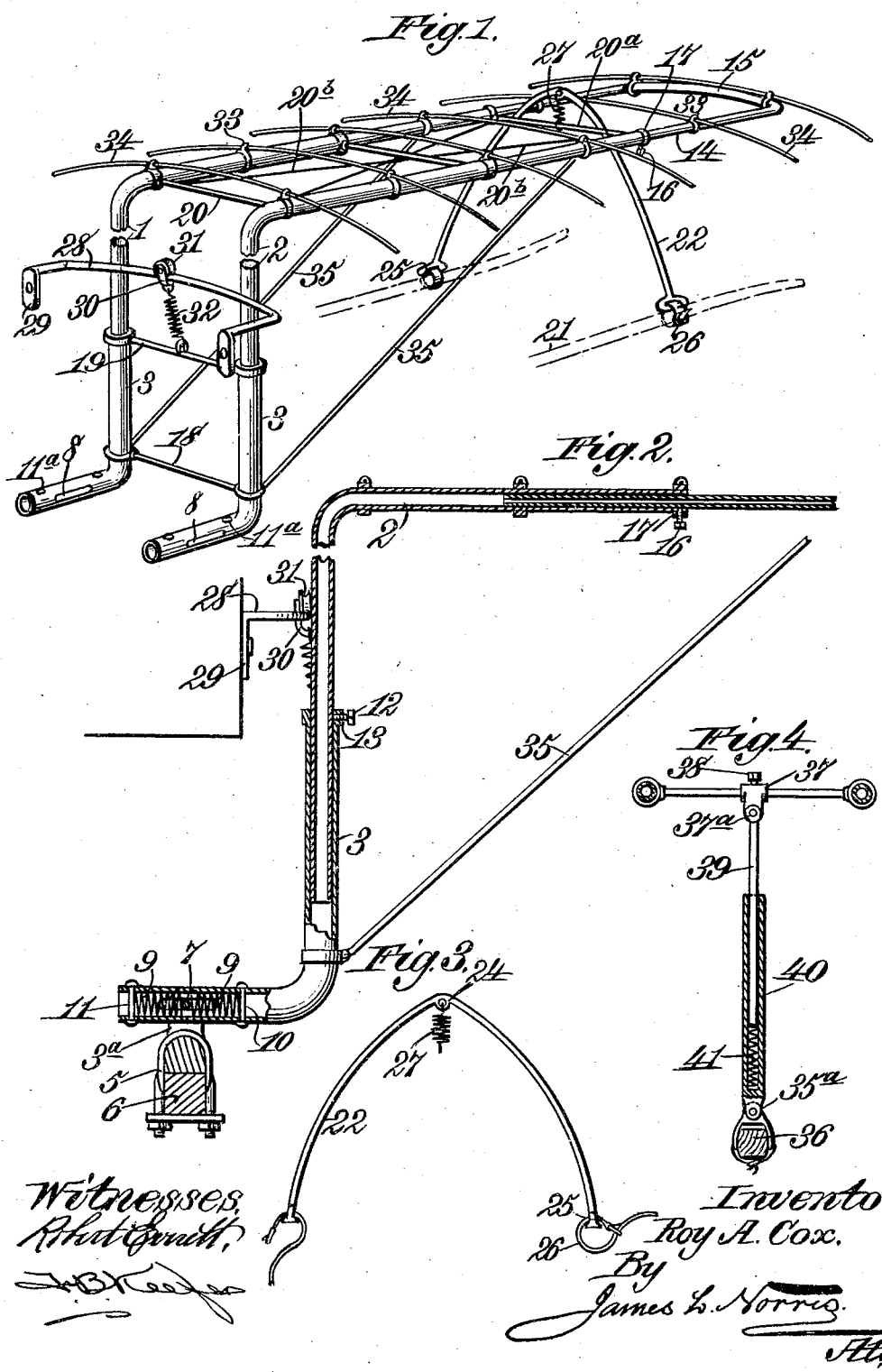
Witnesses
Inventor:
Roy A. Cox.
By James L. Norris
Atty.

UNITED STATES PATENT OFFICE.

ROY A. COX, OF ELWOOD, NEBRASKA.

SUPPORTING-FRAME FOR CANOPIES, AWNINGS, &c.

No. 869,061.  Specification of Letters Patent.  Patented Oct. 22, 1907.

Application filed May 13, 1907. Serial No. 373,453.

*To all whom it may concern:*

Be it known that I, ROY A. COX, a citizen of the United States, residing at Elwood, in the county of Gosper and State of Nebraska, have invented new and useful Improvements in Supporting-Frame for Canopies, Awnings, &c., of which the following is a specification.

This invention relates to a supporting frame for canopies, covers or awnings for shielding horses and other draft animals from rain and the rays of the sun while attached to a vehicle; and the object thereof is to provide a support of such class in a manner as hereinafter set forth with means whereby the support is vertically, as well as longitudinally, adjustable, so as to provide for suspending a canopy, cover or awning at the desired height and to further provide for different lengths of canopies, awnings or covers.

A further object of the invention is to provide the frame with a cushioned means for attaching it to an axle and body of a vehicle so that the support will readily turn with the shafts or tongue of the vehicle when occasion so requires.

Further objects of the invention are to provide a supporting frame for the purpose set forth which shall be simple in its construction, readily set up for use in connection with one or a pair of draft animals, readily adjustable, strong, durable, efficient in its use and comparatively inexpensive to manufacture.

With the foregoing and other objects in view the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views and in which—

Figure 1 is a perspective view of a frame for awnings, canopies or covers in accordance with this invention and showing the adaptation of the same in connection with the protecting of a single draft animal; Fig. 2 is a vertical sectional view through one of the side members of the support; Fig. 3 is a perspective view of the arch-shaped supporting member connected to the support and secured to the shafts of the vehicle, and Fig. 4 is a sectional view of a supporting frame when used for a pair of draft animals.

Referring to the drawings by reference characters, 1—2 denote a pair of inverted, angle-shaped tubular members each constituting a part of one side of the frame. The vertical portion of each of said members extends in the vertical portion of an L-shaped member 3.

The frame is coupled to the axle of the vehicle in the following manner: The longitudinal portion of each of said members 3 extends between a pair of lugs 3ª (only one is shown), which project vertically from the top of a yoke 5 for connecting said longitudinal portion to the vehicle axle 6. Secured to the lugs 3ª is a pin 7 which projects through a slot 8 formed in the longitudinal portion. A cushioning spring 9 is mounted in the longitudinally-extending portion and which has one end fixed to the bolt 10 and its other end to the plate 11. The bolts 10—11 extend through the longitudinal portion, openings 11ª being provided for such purpose. The pin 7 is adapted to extend between a pair of the coils of the cushioning spring 9 and act as an abutment for the compression of the spring 9 if the longitudinal portion is shifted forwardly or rearwardly of the axle.

The vertically-extending portions of the members 3 are adapted to have the vertically-extending portions of angle-shaped members 1 and 2 telescope therein so that said angle-shaped members can be vertically adjusted, thereby varying the height of the supporting frame. The angle-shaped members 1 and 2 when adjusted are fixed in such position through the medium of the set-screws 12 which extend through the collars 13 of the members 3 and engage with the vertically-extending portions of the angle-shaped members 1 and 2.

The longitudinally-extending portions of the angle-shaped members 1, 2 are adapted to receive the arms 14 of a U-shaped member 15 which forms the forward end of the frame, the U-shaped member 14 telescoping within the angle-shaped members 1, 2 and is longitudinally adjustable so as to provide for different lengths of the frame. The member 15 when adjusted is retained in such position through the medium of the set-screws 16 which extend through the collars 17 and are adapted to engage the arms 14 of the member 15.

The L-shaped members 3 are spaced, as well as braced apart, through the medium of the cross-rods 18, 19 which are fixed to said members 3. The angle-shaped members are spaced, as well as braced apart, through the medium of the cross-rods 20, 20ª inclined braces 20ᵇ and also by the yoke-shaped member 15.

The longitudinally-extending portions of the members 1, 2 and U-shaped member 15 are supported upon the shafts 2 of a vehicle by an arch-shaped member 22 having an eye 24 formed in the center thereof at its top and its lower ends also provided with an eye, as at 25. Through the eyes 25 extend the fastening straps 26 for connecting the member 22 to the shafts 21. Connected to the eye 24 is the upper end of a coiled spring 27, while the lower end thereof is secured to the cross-bar 20ª.

The frame is connected to the body of the vehicle by a bracket 28 having angular ends 29 through which extend suitable hold-fast devices (not shown) for securing said bracket 28 in position. Mounted upon the bracket 28 is a carrier 30 in which is journaled a roller 31 adapted to travel over the bracket 28 when the shafts 21 are turned in either direction. The carrier 30 has its lower end secured to the upper end of a coiled spring 32, the lower end of said spring being connected to the rod 19.

The longitudinally-extending portions of the angle-shaped members 1, 2, as well as the arms 14, are each provided on their tops with eyes 33, the eyes upon the top of the member 1 and one arm 14 opposing the eyes upon the top of the member 2 and the other arm 14. Mounted in each pair of eyes 33 is a supporting arm 34 projecting from each of the members 1, 2, as well as each of the arms 14. The supporting arms 34 are adapted to have the canopy, awning or cover secured thereto and are of such length as to properly shield the animal.

Inclined supports 35 extending between the members 3 and members 1 and 2 serves to prevent the forward ends of the members 1 and 2 from sagging and also prevents the entire weight of the forward end of the device from bearing upon spring 27.

The frame as shown in Fig. 1 is adapted for use for protecting a single animal. When a pair of animals is hitched to a vehicle the arch-shaped member 22 is dispensed with and a vertically-adjustable T-shaped member is provided and which is hinged as at 35ª to the pole 36. The horizontal section of said T-shaped member is formed by the rod 20ª, the vertical section being attached to said rod 20ª by a collar 37 and a set-screw 38. The collar 37 is hinged as at 37ª to the upper part of the vertical section of said T-shaped member. Said vertical section is formed of two elements, one indicated by the reference character 39 and the other by the reference character 40, the element 39 extending in the element 40 and mounted upon the cushioning spring 41. By hinging the rod 20 to the element 39 and the hinging of the element 40 to the pole 36, when the latter is jerked from side to side, it will have no effect on the shades.

When the device shown in Fig. 4 is employed but one brace bar 35 is used, the latter being secured intermediate the frame. As this change is so obvious it is thought unnecessary to illustrate it.

The frame can be adapted in a successful manner to different kinds of agricultural implements by slight changes in the way of the coupling. To a riding cultivator, by way of example, it would be coupled in the same manner as to a vehicle, but instead of using the element 28, a chain or other suitable flexible member would be directly attached to the bar 19 and to some point at the rear of the cultivator frame. The spring 27, however, would be arranged under the bar 20 and over the support 22 instead of in the manner as shown.

The sides, and rear end of the frame are formed by the members 1, 2, 3 and 15, the said end being vertically adjustable owing to the telescoping of the members 1, 2 in the members 3, the sides being longitudinally adjustable by the member 14 telescoping in the members 1, 2. The top of the frame is constituted by the arms 34 which are adapted to support the canopy, awning or cover.

What I claim is—

1. A supporting frame for awnings, canopies and covers comprising a pair of L-shaped members, a pair of angle members adjustably connected to said L-shaped members, a U-shaped member adjustably connected to the angle-shaped members, and supporting arms secured to said angle-shaped members and said U-shaped member.

2. A supporting frame for awnings, canopies and covers comprising a pair of L-shaped members, a pair of angle members adjustably connected to said L-shaped members, a U-shaped member adjustably connected to the angle-shaped members, supporting arms secured to said angle-shaped members and said U-shaped member, and cushioned means for connecting the L-shaped members to the axle and body of a vehicle.

3. A supporting frame for awnings, canopies, and covers comprising a pair of L-shaped members, a pair of angle members adjustably connected to said L-shaped members, a U-shaped member adjustably connected to the angle-shaped members, supporting arms secured to said angle-shaped members and said U-shaped member and a support connected to the angle-shaped members and adapted to be attached to the shafts or tongue of a vehicle.

4. A supporting frame for awnings, canopies and covers comprising a pair of L-shaped members, means extending through the longitudinal portion of each of said members for connecting it to the axle of a vehicle, a pair of vertically-adjustable angle members connected to said L-shaped members, a longitudinally adjustably U-shaped member connected to said angle-shaped members, and supporting arms secured to said angle-shaped members, and said U-shaped member and of a length as to extend from each side thereof.

5. A supporting frame for awnings, canopies and covers comprising a pair of L-shaped members, means extending through the longitudinal portion of each of said members for connecting it to the axle of a vehicle, a pair of vertically-adjustable angle members connected to said L-shaped members, a longitudinally - adjustable U - shaped member connected to said angle-shaped members, supporting arms secured to said angle-shaped members and said U-shaped members and of a length as to extend from each side thereof, and bracing means having one end connected to the L-shaped members and the other end to said angle-shaped members.

6. A supporting frame for awnings, canopies and covers, comprising a pair of L-shaped members, means extending through the longitudinal portion of each of said members for connecting it to the axle of a vehicle, a pair of vertically-adjustable angle members connected to said L-shaped members, a longitudinally-adjustable U-shaped member connected to said angle-shaped members, supporting arms secured to said angle-shaped members and said U-shaped members and of a length as to extend from each side thereof, bracing means having one end connected to the L-shaped members and the other end to said angle-shaped members, and resilient connecting means between said L-shaped members and the body of a vehicle.

7. A supporting frame for awnings, canopies and covers, comprising a pair of L-shaped members, means extending through the longitudinal portion of each of said members for connecting it to the axle of a vehicle, a pair of vertically-adjustable angle members connected to said L-shaped members, a longitudinally-adjustable U-shaped member connected to said angle-shaped members, supporting arms secured to said angle-shaped members and said U-shaped members and of a length as to extend from each side thereof, bracing means having one end connected to the L-shaped members and the other end to said angle-shaped members, resilient connecting means between said L-shaped members and the body of a vehicle, and a cushioned supporting means between said angle-shaped members and the shaft or tongue of a vehicle.

8. A supporting frame for awnings, canopies and covers comprising a pair of L-shaped members, means for connecting them to the axle of a vehicle, a bracket adapted to be attached to the vehicle body, a roller traveling upon said bracket, a resilient connection between said roller and said L-shaped members, a pair of vertically-adjustable angle-shaped members connected to said L-shaped members, a longitudinally-adjustable U-shaped member connected to said angle-shaped members, and supporting arms secured to said angle-shaped members and said U-shaped member.

9. A supporting frame for awnings, canopies and covers comprising a pair of L-shaped members, means for connecting them to the axle of a vehicle, a bracket adapted to be attached to the vehicle body, a roller traveling upon said bracket, a resilient connection between said roller and said L-shaped members, a pair of vertically-adjustable angle-shaped members connected to said L-shaped members, a longitudinally-adjustable U-shaped member connected to said angle-shaped members, supporting arms secured to said angle-shaped members and said U-shaped member, and a resilient supporting means between said angle-shaped members and the shafts or tongue of a vehicle.

10. A supporting frame for awnings, canopies and covers comprising a pair of L-shaped members, means for connecting them to the axle of a vehicle, a bracket adapted to be attached to the vehicle body, a roller traveling upon said bracket, a resilient connection between said roller and said L-shaped members, a pair of vertically-adjustable angle-shaped members connected to said L-shaped members, a longitudinally-adjustable U-shaped member connected to said angle-shaped members, supporting arms secured to said angle-shaped members an dsaid U-shaped member, a resilient supporting means between said angle-shaped members and the shafts or tongue of a vehicle, brace rods between said L-shaped members, and brace rods between said L-shaped members and said angle-shaped members.

In testimony whereof I have hereunto set my hand in presence of two subscribing witnesses.

ROY A. COX.

Witnesses:
  O. E. BOZARTH,
  A. W. SMITH.